United States Patent [19]

Saliterman

[11] Patent Number: 4,642,055

[45] Date of Patent: Feb. 10, 1987

[54] HEMODYNAMIC MONITORING TRAINER

[76] Inventor: Steven S. Saliterman, 1920 S. First, #1008, Minneapolis, Minn. 55454

[21] Appl. No.: 747,767

[22] Filed: Jun. 24, 1985

[51] Int. Cl.⁴ .......................................... G09B 23/32
[52] U.S. Cl. .................................................. 434/268
[58] Field of Search ............... 434/262, 265, 267, 268, 434/272, 273

[56] References Cited

U.S. PATENT DOCUMENTS

| | | | |
|---|---|---|---|
| 2,034,446 | 3/1936 | Saxe | 434/273 |
| 3,376,659 | 4/1968 | Asin | 434/272 |
| 3,426,449 | 2/1969 | Van Noy | 434/273 |
| 3,520,071 | 7/1970 | Abrahamson | 434/265 |
| 3,704,529 | 12/1972 | Cioppa . | |
| 3,795,059 | 3/1974 | Faconti, Jr. . | |
| 3,818,630 | 6/1974 | May . | |
| 3,872,609 | 3/1975 | Smrcka . | |
| 4,140,126 | 2/1979 | Choudhury | 128/325 |
| 4,182,054 | 1/1980 | Wise | 434/268 |
| 4,261,339 | 4/1981 | Hanson et al. | 128/1 D |
| 4,264,312 | 4/1981 | Cianci | 434/262 |
| 4,327,709 | 5/1982 | Hanson et al. | 128/1 D |
| 4,428,383 | 1/1984 | DeVroom | 128/748 |
| 4,439,162 | 3/1984 | Blaine | 434/273 X |
| 4,445,510 | 5/1984 | Rigby | 128/329 |
| 4,451,416 | 5/1984 | Burtscher | 264/46.6 |
| 4,493,653 | 1/1985 | Robbins et al. | 434/262 |
| 4,515,278 | 5/1985 | DeVroom | 211/107 |
| 4,516,580 | 5/1985 | Polanyi | 123/632 |

OTHER PUBLICATIONS

International PCT Application, International Application No.: PCT/US81/01303, Int. Publication Date: 15 Apr. 1982, Title: System and Method for Determining Hemodynamic Characteristics.

Primary Examiner—Harland S. Skogquist
Attorney, Agent, or Firm—Kinney & Lange

[57] ABSTRACT

A computerized training system allows physicians, nurses and other medical professionals to obtain substantial experience in hemodynamic monitoring without need to acquire all that experience with live, critically ill patients. The system simulates the entire process of hemodynamic monitoring, including the physical process of introducing the catheter through an insertion site in a manikin, feeding the catheter through the veins, the heart and into the pulmonary artery, inflating the balloon at the tip of the catheter, and interpreting the measured pressure and other information obtained.

33 Claims, 27 Drawing Figures

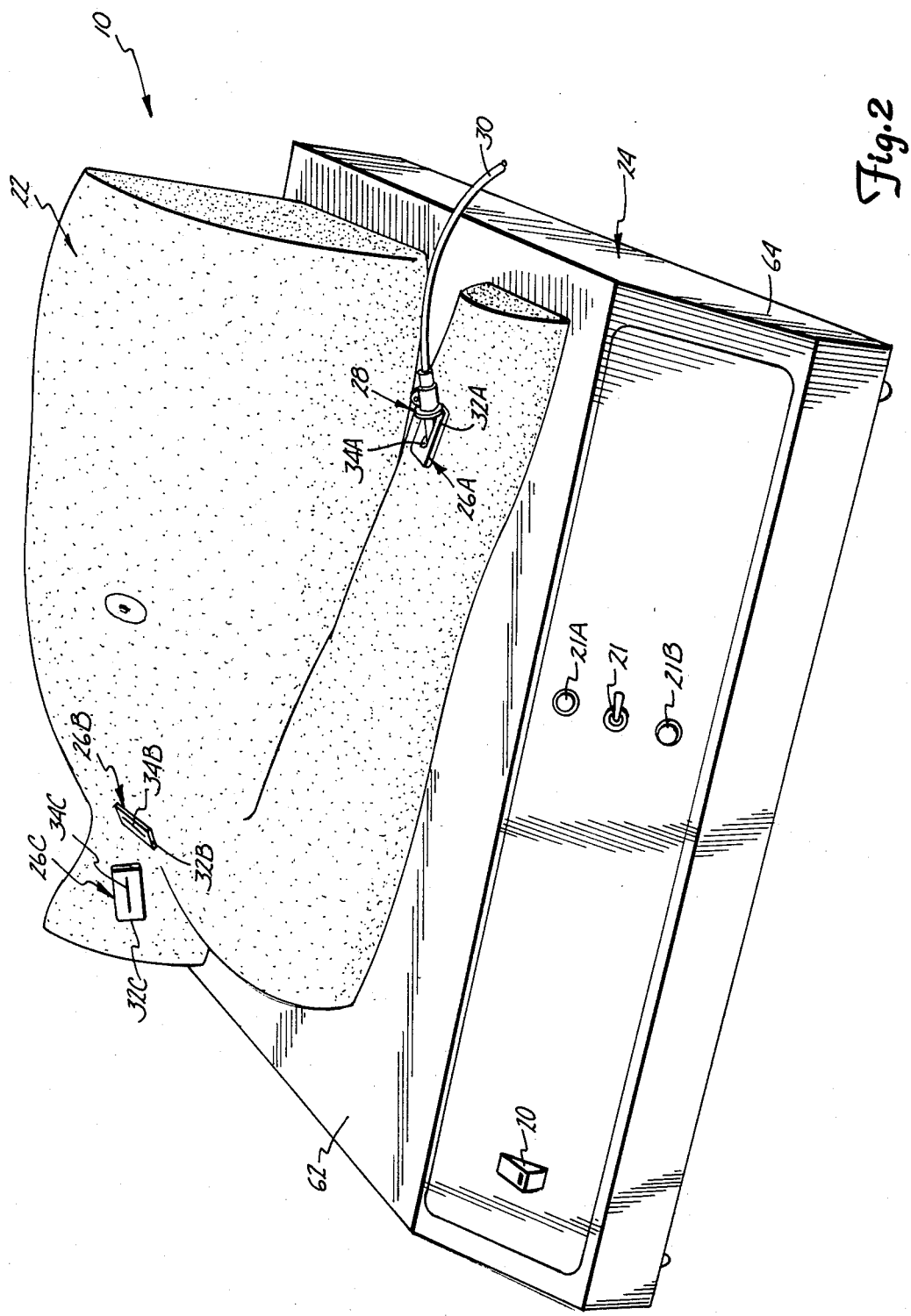

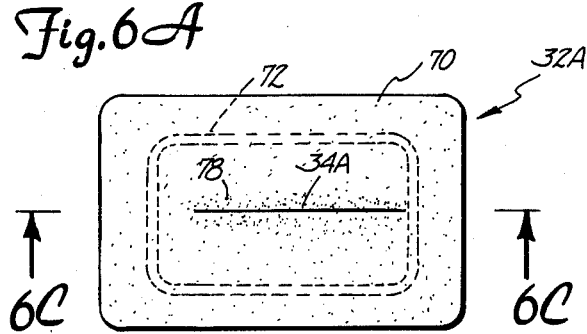
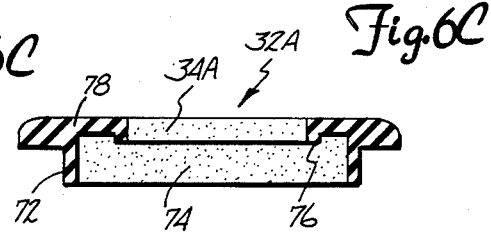
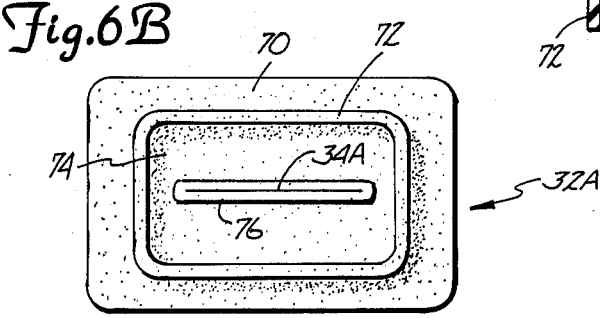
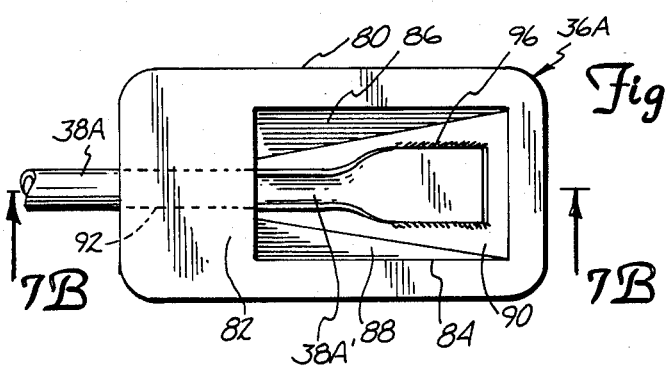
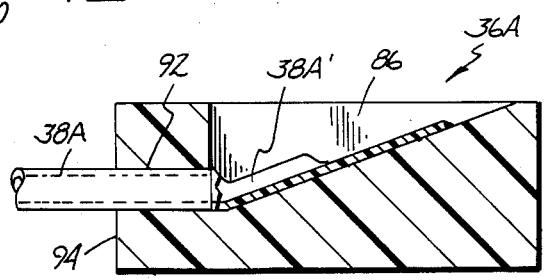
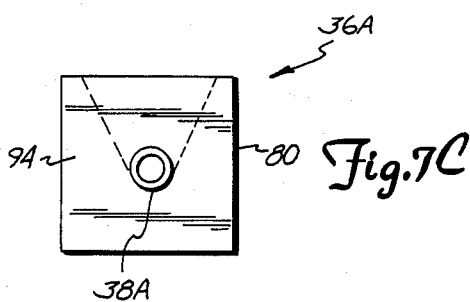

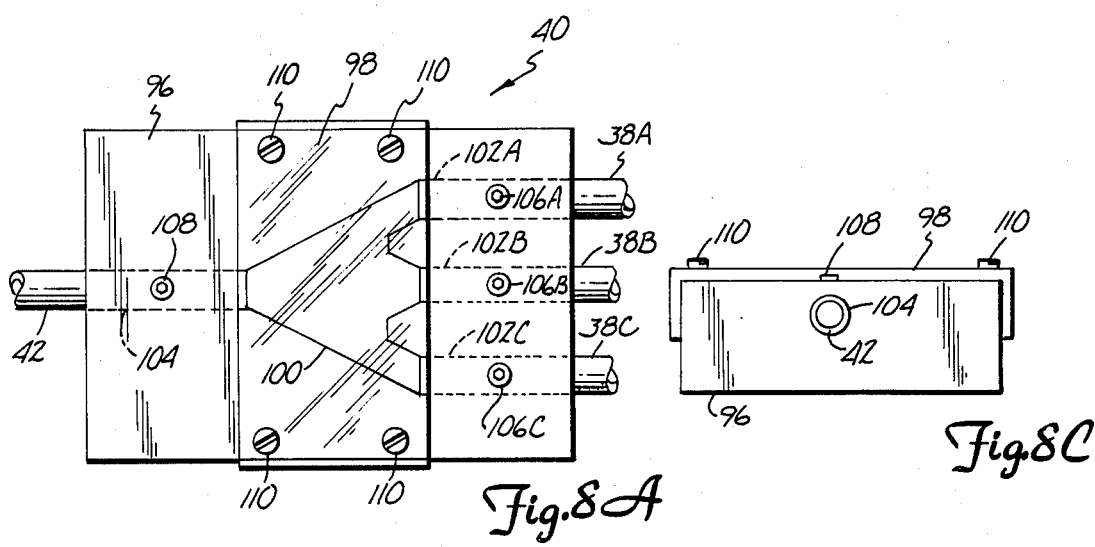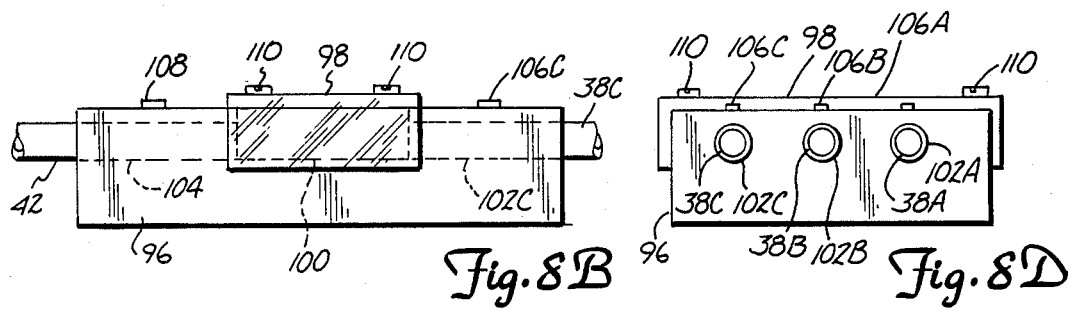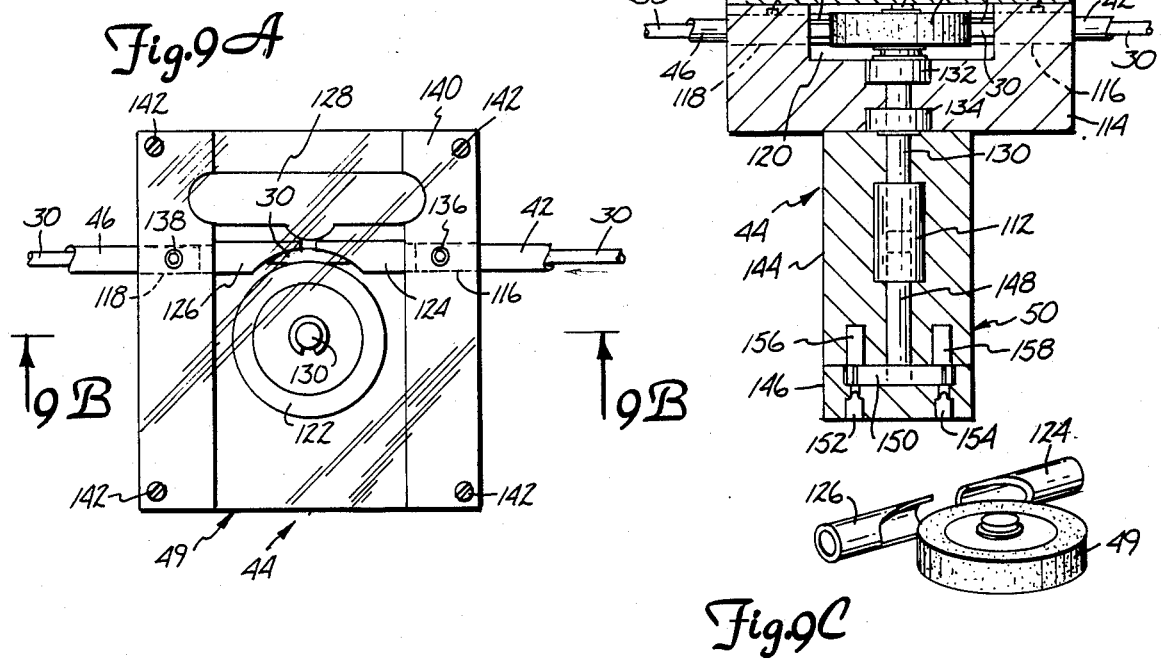

HEMODYNAMIC MONITORING TRAINER

BACKGROUND OF THE INVENTION

1. Field of the Invention

The present invention is related to a computerized training system for physicians, medical students, nurses and other medical professionals. In particular, the present invention relates to a system which teaches the purpose, indications, methods, complications and techniques for hemodynamic monitoring of patients.

2. Description of the Prior Art

Hemodynamic monitoring is the method whereby a patient undergoes placement of a catheter passed from a distant vein, through the heart to the pulmonary vasculature for the purposes of measuring intracardiac, pulmonary artery and wedge pressures. The measured pressure data is used by the physician to determine the type or extent of cardiopulmonary disease, to evaluate therapeutic measures, and to monitor cardiac function.

Hemodynamic monitoring is typically performed by a physician in an intensive care unit of a hospital, while caring for a critically ill patient. Among the diseases for which hemodynamic monitoring is useful are acute myocardial infarctions, heart valvular disorders, cardiomyopathies, pulmonary disorders and congenital defects.

The hemodynamic monitoring catheter is essentially a long synthetic polymer tubing which is small enough to be inserted into a peripheral vein of the body and which is long enough to extend through that vein and the heart to the pulmonary artery within the lungs. There are hollow tubes running the length within the catheter which provide a conduit for manometric measurement of the pressures within the heart and pulmonary artery. Electronic pressure transducers are connected to the end of the catheter outside the body, and these are in turn connected to an oscilloscope display which shows the instantaneous pressure data with time (i.e. a hemodynamic waveform). The catheter may also allow for simultaneous measurement of pulmonary artery and right atrial pressures. A thermister probe near the end of the catheter may be utilized for thermodilution derived measurement of the cardiac output. There is a balloon located at the distal end of the catheter that is inflated by the medical professional as the catheter enters the heart. This inflated balloon assists the catheter tip through the heart chambers into the pulmonary artery. It also may be inflated in the pulmonary artery to obtain a wedge pressure. The wedge pressure is a reflected pressure of the left chambers of the heart through the lung, rather than the direct pressures obtained from the right side of the heart as the catheter is advanced.

Traditionally, training in hemodynamic monitoring has taken place at the bedside, with a more experienced physician (often a cardiologist or internist) demonstrating the technique and methods of waveform interpretation to the inexperienced physician, medical student or nurse. The training process, therefore, has been dependent upon the availability of critically ill patients on which the inexperienced physician, medical student or nurse can practice.

Although the physical process of introducing a catheter into a patient can be simulated, in the past there has been no training system available by which physicians, medical students and other medical professionals can practice and be trained in the techniques of hemodynamic monitoring through simulation, rather than with live patients.

SUMMARY OF THE INVENTION

The hemodynamic monitoring training system of the present invention simulates the process of hemodynamic monitoring, so that a physician, medical student, nurse or other medical professional can obtain substantial experience in hemodynamic monitoring without having to acquire all that experience with live patients. The training system includes a manikin with one or more insertion sites through which a catheter can be inserted. Connected to each insertion site is the guide tubing which provides a passage through which the catheter passes as it is inserted into the manikin. Position sensing means provides an indication of the position of the catheter, and balloon state detecting means provides an indication of whether the balloon at the tip of the catheter is inflated.

The hemodynamic monitoring training system is capable of simulating the entire process of catherization, including the technical processes of site identification, skin preparation and catheter insertion, as well as the advancement of the catheter through a vein to the heart, through the chambers of the heart, and to the pulmonary vasculature. Based upon signals from the position sensing means and the balloon state detection means, outputs are provided which assist in the simulation process. The training system preferably includes a computer with a display which generates simulated waveforms corresponding to the various catheter locations (as indicated by the position sensing means). Simulated measurement of cardiac output and simulated fluoroscopy also are preferably provided. The student may interact with the training system through an input device to the computer to select various therapeutic options and then observe the consequences of those therapeutic options in the simulation.

The hemodynamic monitoring training system, therefore, increases both technical and cognitive skills of the student. In addition, it provides the capability of training a large number of students prior to actual patient contact.

BRIEF DESCRIPTION OF THE DRAWINGS

FIG. 2 is a perspective view of the hemodynamic monitoring trainer showing a hemodynamic monitoring catheter inserted through at an antecubital fossa site.

FIGS. 6A-6C are top, bottom and cross-sectional views of one of the insertion plugs of the trainer.

FIGS. 7A-7C are top, cross-sectional and end views of one of the insertion adapters of the trainer.

FIGS. 8A-8D are top, front and left and right end views of the three-to-one converter of the trainer.

FIG. 9A is a top view of the optical encoder and pressure roller which senses position of the catheter within the trainer.

FIG. 9B is a sectional view along section 9B—9B of FIG. 9A.

FIG. 9C is a perspective view of the cutaway guides and roller wheel of the pressure roller of FIG. 9A.

DETAILED DESCRIPTION OF THE PREFERRED EMBODIMENTS

1. System Overview

Figure 1:
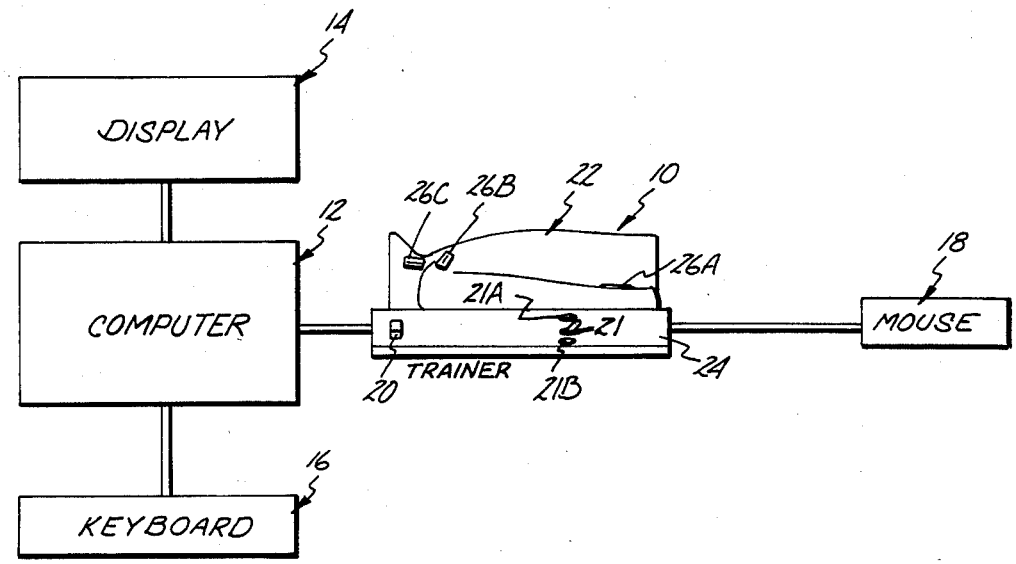
FIG. 1 is a block diagram of the hemodynamic monitoring training system of the present invention.

As shown in the block diagram in FIG. 1, the hemodynamic monitoring training system of the present invention is a computerized training system which includes trainer 10, computer 12, display 14, keyboard 16 and mouse 18. The system simulates the entire process of catherization, and provides the student with mouse driven menu displays and real time feedback of hemodynamic data, so that the student can be trained in all aspects of hemodynamic monitoring prior to any actual patient contact.

In a preferred embodiment, computer 12, display 14, keyboard 16 and mouse 18 are all part of an Apple Macintosh computer system. Trainer 10 interfaces with computer 12 through the mouse port of computer 12, and in turn mouse 18 is connected to trainer 10. Trainer 10 has a power switch 20 (which turns trainer 10 on and off) and a select switch 21 (which determines whether signals from mouse 18 or from the sensing circuitry of trainer 10 will be provided as inputs to computer 12). Indicator lights 21A and 21B, which flank select switch 21, indicate whether mouse 18 or trainer 10 is currently connected to computer 12.

As shown in FIG. 2, trainer 10 includes a life-like manikin 22 of a portion of an upper torso and right arm which is supported on chassis 24. Manikin 22 includes three sites at which a student can practice insertion of the catheter: antecubital fossa site 26A, subclavian vein site 26B, and internal jugular vein site 26C. For purposes of illustration in FIG. 2, catheter needle 28 is shown inserted at site 26A. Catheter tubing 30 is fed through needle 28 into the interior of manikin 22.

In order to simulate actual catheter insertion, each catheter site 26A–26C has an insertion plug 32A–32C with an insertion slit 34A–34C through which the catheter needle 28 is inserted.

Figure 3:
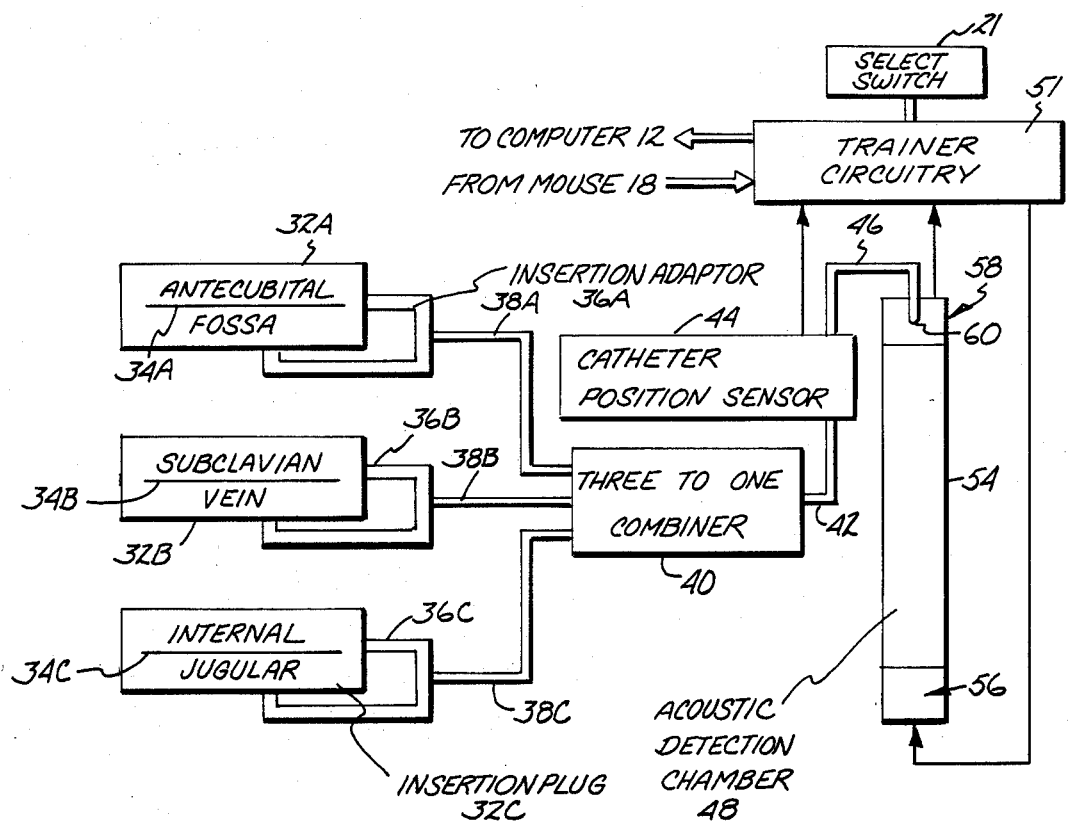
FIG. 3 is a mechanical and electrical block diagram of the trainer.
Figure 4:
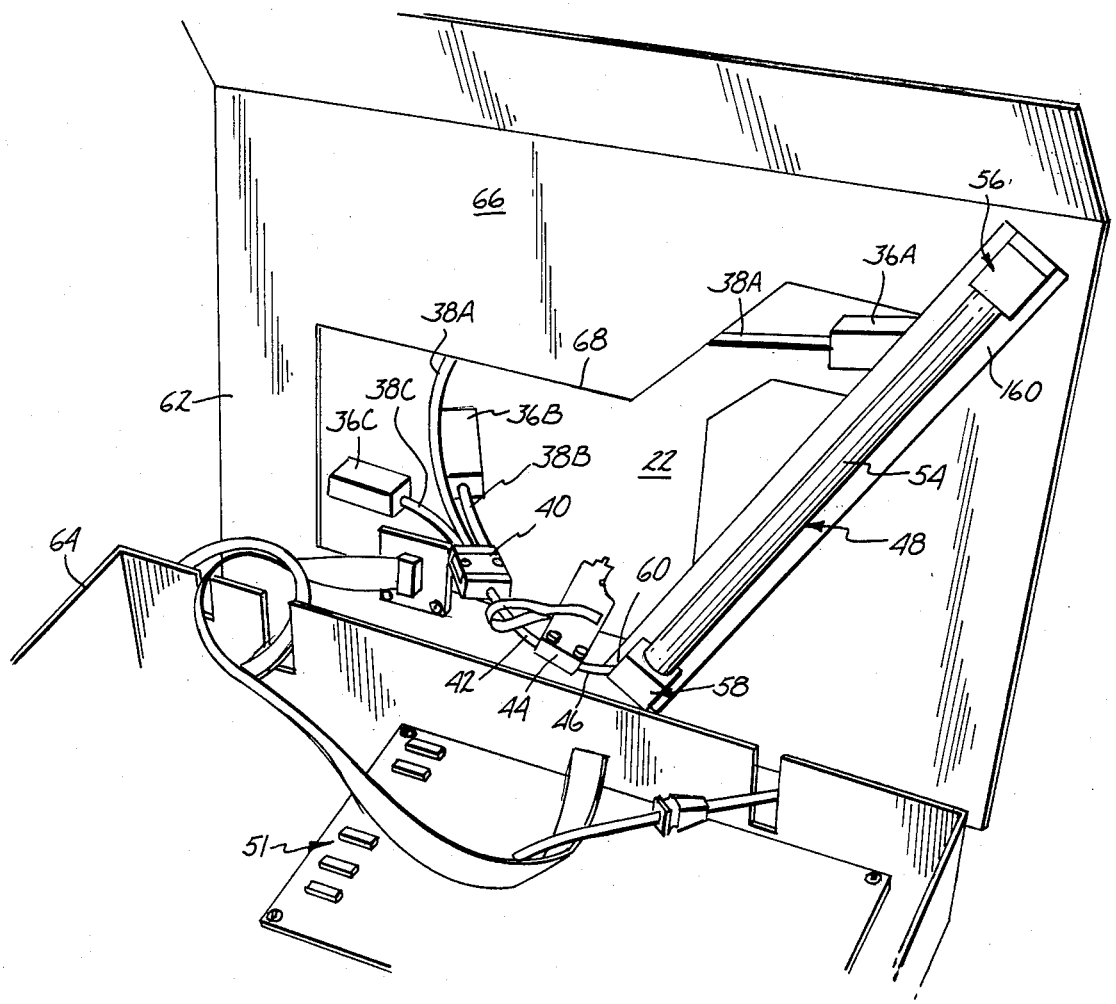
FIG. 4 is a perspective view of the trainer of FIG. 2 with the manikin and chassis top plate pivoted to an open position to reveal their bottom surfaces.

As illustrated in FIGS. 3 and 4, each site 26A–26C has an insertion adapter 36A–36C positioned within manikin shell 22 to receive catheter needle 28 as it is inserted through insertion plugs 32A–32C, respectively. Insertion adapters 36A–36C provide a path for catheter tubing 30 into one of three guide tubes 38A–38C which simulate the veins running from sites 26A–26C, respectively, to the heart.

Guide tubes 38A, 38B and 38C are connected to three-to-one combiner 40 which guides catheter tubing 30 to a single guide tube 42, regardless of the particular guide tube 38A–38C through which the catheter tube 30 is passing.

From three-to-one combiner 40, the catheter tubing 30 passes through guide tube 42, catheter position sensor 44, guide tube 46, and into acoustic detection chamber 48. Catheter position sensor 44 measures how far the tip of catheter tubing 30 has advanced past sensor 44 to allow computer 12 to determine where anatomically the tip of catheter tubing 30 would be located within an actual human body. In the preferred embodiment which will be described in further detail later (in conjunction with FIGS. 9A–9C), catheter position sensor 44 preferably includes pressure roller 49 connected to optical shaft encoder 50. As the catheter tubing 30 passes through position sensor 44, it causes pressure roller 49 to rotate, thus causing movement of optical shaft encoder 50. Signals from optical shaft encoder 50 are supplied through trainer circuitry 51 to computer 12. Pressure roller 49 turns with sufficient torque to turn optical shaft encoder 50, while at the same time not adding much resistance to the movement of catheter tubing 30.

Figure 5:
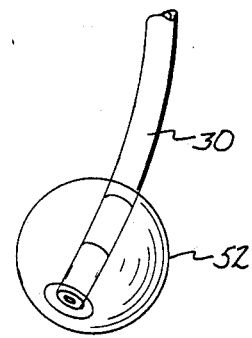
FIG. 5 is a perspective view of the distal end of a hemodynamic monitoring catheter with its balloon inflated.

As described previously, hemodynamic monitoring catheter 30 includes a balloon 52 at its tip which can be inflated to assist the catheter tip through the heart chambers and into the pulmonary artery. Balloon 52 can also be inflated in the pulmonary artery to obtain a wedge pressure. FIG. 5 shows the distal end of catheter tube 30, with balloon 52 inflated.

Acoustic detection chamber 48 provides a means for sensing when balloon 52 is inflated or deflated. Acoustic detection chamber 48 preferably includes a cylindrical tube 54 with transmitter assembly 56 mounted at one end and receiver assembly 58 mounted at an opposite end. Catheter tubing 30 enters acoustic detection chamber 48 through inlet port 60 in receiver assembly 58.

Acoustic detection chamber 48 senses whether balloon 52 is inflated by sending sound pulses from transmitter assembly 56 down tube 54 toward receiver assembly 58. The condition of balloon 52 is determined based upon the amount of attenuation of the sound pulses received at receiver assembly 58.

When select switch 21 selects signals from trainer 10, trainer circuitry 51 provides signals to computer 12 which indicate whether the balloon 52 is inflated or deflated and also provides signals from catheter position sensor 44. Alternatively, when select switch 21 is in an opposite position, the signals provided to computer 12 are from mouse 18.

Based upon those signals, computer 12 interacts with the student by presenting information on display 14. That information includes a mouse driven menu by which the student can select one of a variety of different training modes, as well as necessary educational text. In one mode, computer 12 causes simulated waveform displays to be presented on display 14 which are a function of the position of the tip of catheter 30 and the state of balloon 52. In another mode computer 12 provides on display 14 a simulated fluoroscopic image, which allows the student to observe a simulation of the movement of the catheter through the heart and vasculature (based upon the signals from position sensor 44) much as it would appear if the student were actually inserting a As shown in FIGS. 8A–8D, three-to-one combiner 40 includes base 96 and cover 98. Base 96 has a generally V-shaped central channel 100 which connects at its inlet end to entry ports 102A–102C, and which connects at its outlet end to exit port 104. Tubing 38A–38C extend through entry ports 102A–102C, respectively, to the inlet end of channel 100. Set screws 106A–106C hold the outlet ends of tubing 38A–38C securely in entry ports 102A–102C, respectively.

Tubing 42 extends into exit port 104 so that its inlet end is located at the outlet end of channel 100. Set screw 108 holds tubing 42 securely within exit port 104.

Cover 98, which is preferably a clear plastic plate, covers the otherwise open top of channel 100, so that the catheter must pass from tubing 38A, 38B, or 38C, through channel 100, to tubing 42. Cover 98 is held in place over channel 100 by screws 110.

In other embodiments of the present invention, other or additional manikin insertion sites can be used. In those embodiments where more than three sites are used, combiner 40 simply includes a greater number of entry ports to receive tubing from additional insertion adapters. The function of combiner 40 remains unchanged: to cause a convergence of the possible paths of the catheter to a single path which will lead through catheter position sensor 44 and into acoustic detection chamber 48.

g. Catheter Position Sensor 44

Catheter position sensor 44 monitors movement of the catheter as it passes from three-to-one combiner 40 through tubing 42 and tubing 46 to acoustic detection chamber 48. It provides the data necessary to establish how far catheter 30 has been advanced into manikin 22. This data specifies the direction and extent of movement, so that computer 12 can determine which chamber of the heart or pulmonary vasculature the tip of the catheter 30 would be in, if it were in a human chest.

In the preferred embodiment illustrated in FIGS. 9A–9C, catheter position sensor 44 includes pressure roller assembly 49 and optical shaft decoder assembly 50, which are interconnected by shaft coupling 112.

Pressure roller assembly 49 includes a housing 114 having an entry port 116 for receiving the outlet end of tubing 42 and an exit port 118 for receiving the inlet end of tubing 46. Between ports 116 and 118 is a channel 120 in which roller wheel 122, guides 124 and 126, and counter pressure bar 128 are mounted. Wheel 122 is mounted on shaft 130, which is rotatably supported by bearings 132 and 134 and is connected at its lower end to shaft coupling 112.

As catheter 30 passes through pressure roller assembly 49, it passes from tubing 42 through guide 124 to guide 126 and then to tubing 46. Guides 124 and 126 are split and are cut away so that catheter 30 makes contact with wheel 122. Thus, movement of catheter 30 in either direction will cause rotation of wheel 122 and shaft 130. The direction of movement of catheter 30 determines the direction of rotation of wheel 122 and shaft 130.

Pressure roller assembly 49 must accommodate catheters of different sizes and designs, including various balloon attachments. It must, therefore, allow these various catheters to slide easily across wheel 122 while not slipping or binding. For example, the deflated balloon 52 on the tip of catheter 30 provides a bumpy surface that ordinarily would not pass through a more rigid metering device. To accommodate both balloon 52 as well as the more smooth catheter tubing 30, pressure roller assembly 49 causes catheter 30 to be guided closely along the wheel 122 as the result of the bias force which is exerted from counter pressure bar 128 to the guideway formed by guides 124 and 126. This guideway is split to allow some flexibility as different diameter catheters pass through pressure roller assembly 49.

Alternatively, the means for urging catheter 30 toward wheel 122 can take the form of a counter pressure wheel which is spring loaded to be urged in the direction toward wheel 122. This allows the nip defined between the two wheels to vary depending upon the size of the catheter passing through, without adding significant friction or resistance to the motion of catheter 30.

As shown in FIGS. 9A and 9B, the outlet end of tubing 42 is secured in entry port 116 by set screw 136, and the inlet end of tubing 46 is secured in exit port 118 by set screw 138. A clear plastic cover 140 preferably covers the entire top surface of pressure roller assembly 49 and is secured in place by screws 142.

Encoder assembly 50 includes a two-piece housing 144 and 146, in which is mounted encoder shaft 148, encoder wheel 150, a pair of photodiodes 152 and 154, and a pair of phototransistors 156 and 158. Encoder shaft 148 is connected by shaft coupler 112 to shaft 130 of pressure roller assembly 49. As wheel 122 of pressure roller assembly 49 rotates, encoder shaft 148 rotates, thus causing rotation of encoder wheel 150. The slits of encoder wheel 150 move past photodiodes 152 and 154 to allow light to pass to phototransistors 156 and 158. By the use of two photodiodes 152 and 154 and two phototransistors 156 and 158, both incremental movement and the direction of movement can be determined by decoding the output signals from phototransistors 156 and 158.

In one embodiment of the present invention, encoder assembly 50 is the same assembly used in the mouse of the Apple Macintosh computer. This is particularly advantageous when computer 12 is an Apple Macintosh computer, since the signals from encoder assembly 50 can be decoded by computer 12 without the need for any additional special circuitry.

h. Acoustic Detection Chamber 48

Acoustic detection chamber 48 represents the end of the pathway for catheter 30. Once the tip of catheter 30 has reached acoustic detection chamber 48, balloon 52 can be inflated, and a determination will be made automatically as to whether or not balloon 52 has in fact been inflated.

Figure 10:
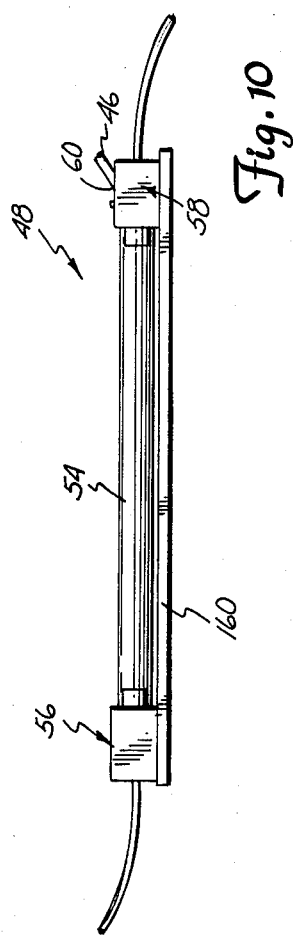
FIG. 10 is a side view of the acoustic detection chamber used for balloon inflation sensing of the trainer.
Figure 11:
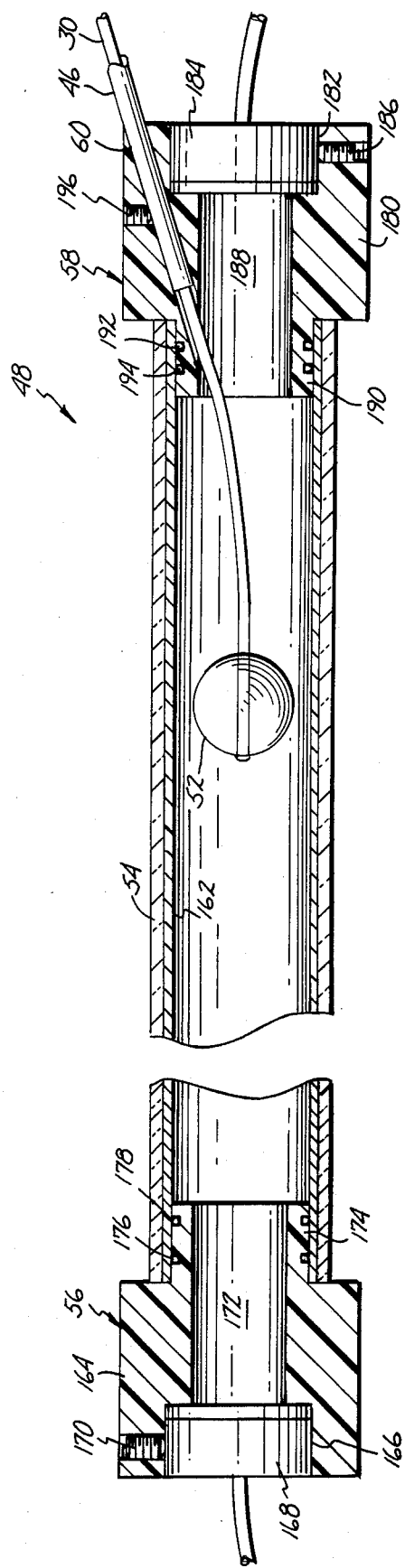
FIG. 11 is a sectional view of the acoustic detection chamber of FIG. 10 with the catheter balloon inflated within the chamber

As illustrated in FIGS. 10 and 11, acoustic detection chamber 48 preferably includes cylindrical tube 54 with transmitter assembly 56 mounted at one end, and receiver assembly 58 located at the opposite end. The entire acoustic detection chamber 48 is preferably supported by support plate 160, which in turn is mounted on the bottom side of top plate 66 (as illustrated in FIG. 4).

In a preferred embodiment, tube 54 is preferably a PVC cylinder with a coating 162 of polytetrafluoroethylene on its inner surface. Coating 162 reduces friction between balloon 52 and the inner surface of cylinder 54. In addition, powder may be added inside cylinder 54 to further decrease friction between balloon 52 and coating 162.

catheter into a live patient and observing it with the assistance of a fluoroscope.

The data storage capabilities of computer 12 also allow the storage of patient case histories, with simulated waveforms based upon catheter position. In these case histories, the student is required to select from a group of therapeutic options which are presented, and computer 12 then displays the consequences of that selected therapeutic option by showing the resulting simulated waveforms.

2. Mechanical Components a. Manikin 22

Manikin 22 is, in one preferred embodiment, made of fiberglass and polyester resinol. Other synthetic materials, such as polyvinyl can also be used.

Manikin 22 is, in the embodiment shown in FIG. 2, a life size portion of the neck, upper torso and right arm of a human body, and is preferably flesh color with accurate anatomical markings.

Manikin 22, together with insertion plugs 32A–32C, provide an opportunity for the student to identify important anatomical landmarks for catheter insertion, to prepare the skin site as would be done in real-life, to utilize standard catheter insertion needle, sheath and dialator kits, and finally to insert the catheter tubing 30 as would be done on a real patient.

b. Chassis 24

As shown in FIGS. 2 and 4, chassis 24 includes cover 62 and base 64. Manikin 22 is attached to top plate 66 of cover 62. As best shown in FIG. 4, top plate 66 includes a manikin access opening 68 to provide access to the components mounted within manikin 22. All of the trainer circuitry 51 is located within chassis 24.

c. Insertion Plugs 32A–32C

FIGS. 6A–6C show top, bottom and sectional views, respectively, of insertion plug 32A, which is typical of all three insertion plugs 32A–32C. Insertion plugs 32A–32C are each bonded to the top surface of manikin 22 over a rectangular opening at sites 26A–26C, respectively.

Insertion plug 32A includes entry slit 34A, plug top 70, neck 72, cavity 74 and entry lip 76. Insertion plug top 70 has an area which is larger than the opening into which insertion plug 32A is mounted in manikin 22. Neck 72 is of a size to fit snugly within the opening in manikin 22, so that insertion plug 32A can be mounted securely to manikin shell 22 by application of an adhesive glue to the bottom surface of plug top 70 and the outer surface of neck 72.

Hardened entry lip 76 adds strength to the surfaces of entry slit 34A. This minimizes wear and tear on insertion plug 32A with repeated insertions and removal of the insertion needle, sheath and dialator of catheter needle 28.

Insertion plug 32A preferably is flesh colored, and includes a vein coloration area 78 which is generally aligned with entry slit 34A.

In a preferred embodiment, insertion plugs 32A–32C are made of a combination casting of vinyl dispersions No. 65 and Plastisol and No. 90 Plastisol. Hardened inner lip 76 is made by placing a small amount of blue colored No. 90 Plastisol in a mold and precasting, and then adding the flesh-tone colored No. 65 Plastisol in the mold for full-time casting. The result is an insertion plug which is durable, flexible which provides natural coloration in both the skin and the underlying vein, and which simulates the natural feel of passing needle 28 into the human skin without destroying the insertion plug 32A–32C with a single use.

A further advantage of insertion plugs 32A–32C is that in the event any one of the plugs is damaged or worn out by repeated use, it can easily be removed and replaced.

d. Insertion Adapters 36A–36C

Insertion adapters 36A–36C serve as receiving ports for the catheter assembly 28 (which includes an insertion needle, introducer sheath, dialator, and tubing 30). Each adapter 36A–36B is bonded under a rectangular opening cut into manikin 22 at sites 26A–26C, respectively. FIGS. 7A–7C show top, sectional and end views of insertion adapter 36A, which is representative of all three insertion adapters 36A–36C.

Insertion adapter 36A preferably has a plastic body 80 made from a casting of vinyl dispersion No. 90 plastisol. In its top surface 82, body 80 has a rectangular cavity 84 with a pair of slanted side walls 86 and 88 and a slanted bottom surface 90 which form a funnel toward circular passage 92, which extends from the lower end of cavity 84 out through end 94 of body 80. Tubing 38A extends through passage 92 and into cavity 84. The portion 38A' of tubing 38A which is located within cavity 84 has its top half removed, and is bonded to slanted surface 90 by adhesive 96 (which is preferably a silicone cement).

The rectangular opening of cavity 84 is aligned with the generally rectangular cavity 74 of insertion plug 32A. As a result, insertion slit 34A of insertion plug 32A is generally aligned with the center of cavity 84 and with passage 92.

In a preferred embodiment in which insertion adapters 36A–36C are castings of vinyl dispersion No. 90 plastisol, each adapter 36A–36C is secured to the inner surface of manikin 22 first with cyanoacrylate glue, and then are secondarily sealed with a bead of silicone cement around the outer edge of body 80.

e. Tubing 38A–38C, 42 and 46

Tubing 38A–38C, 42 and 46 provide passageways for catheter 30 among the various mechanical components of trainer 10. The tubing, therefore, must provide a relatively friction-free path for the catheter. Polytetrafluoroethylene tubing has been found to be particularly advantageous in allowing catheter 30 to pass with a minimum of friction and binding. Other tubing materials which have been used tended to cause binding between the deflated balloon 52 at the tip of catheter 30 and the inner walls of the tubing.

In the preferred embodiment, tubing 38A–38C, 42 and 46 has an outside diameter of 0.175 inch, an inside diameter of 0.135 inch, and a wall thickness of 0.020 inch.

f. Three-to-One Combiner 40

Three-to-one combiner 40 combines the three separate possible paths of catheter 30 into a single path which travels through catheter position sensor 44 and into acoustic detection chamber 48. At its inlet end, three-to-one combiner 44 receives the ends of tubing 38A–38C, and at its outlet it receives the inlet end of tubing 42.

shot multivibrators 266 and 268, capacitors 270 and 272, and resistors 274 and 276.

The output of receiver 220 is supplied to comparator 224, where it is temporally compared with a reference signal from reference circuit 222. Reference circuit 222 includes a positive triggered one-shot multivibrator 278, with associated timing capacitor 280 and potentiometer 282 and a negative triggered one-shot multivibrator 284 with associated timing capacitor 286 and resistor 288.

The receiver and reference signals are supplied to dual input NAND gate 290 of comparator 224. The output of NAND gate 290 is inverted by inverter 292 and supplied to retriggered one-shot multivibrator 294, whose period is determined by capacitor 296 and resistor 298.

One output of one-shot 294 is supplied to optical isolator 214, which includes drive transistor 300, resistors 302 and 304, photodiode 306, and phototransistor 308. The output of optical isolator 214 is supplied to computer interface 202 and is in turn sent to computer 12 whenever select switch 21 has selected signals from trainer 10 as opposed to signals from mouse 18.

The outputs of one-shot 294 of comparator 224 are also supplied to a diagnostic circuit which includes a pair of light-emitting diodes 310 and 312, and a pair of inverters 314 and 316.

Figure 14:
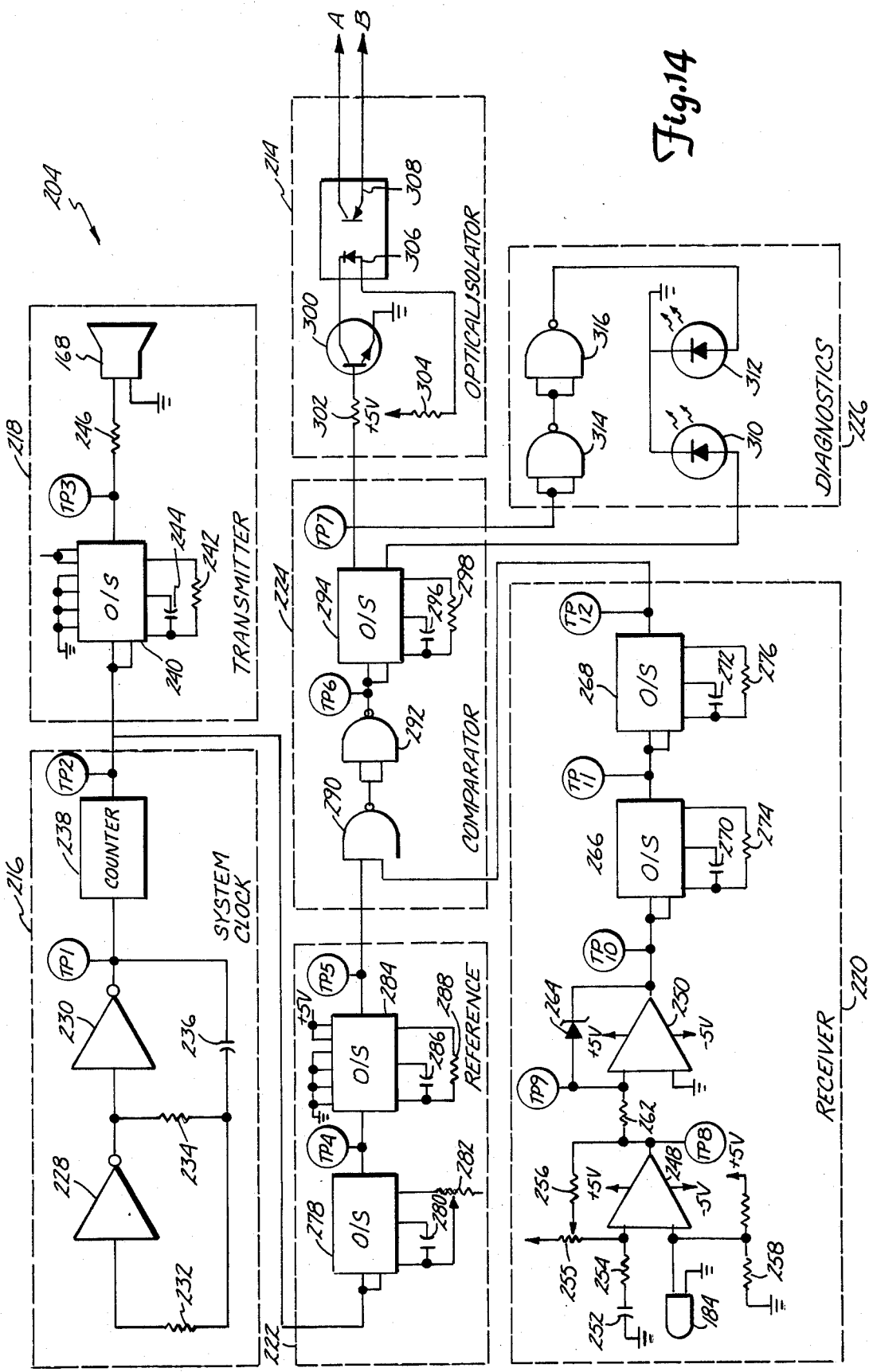
FIG. 14 is an electrical schematic diagram of the balloon detection circuitry.
Figure 15:
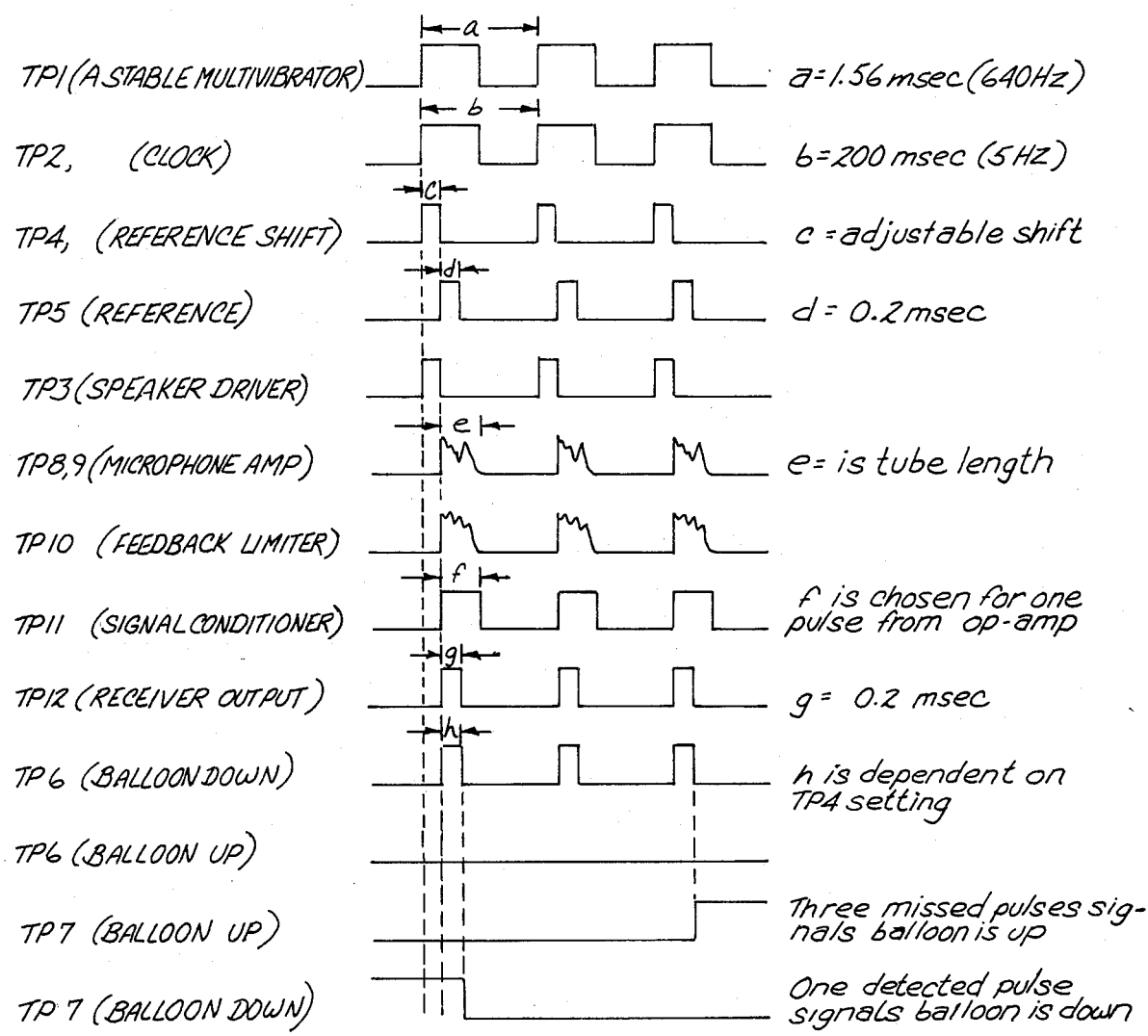
FIG. 15 is a timing diagram showing waveforms produced at selected points within the circuit of FIG. 14, both with the balloon inflated and with the balloon deflated.

In FIG. 14, twelve different test points labeled TP1 through TP12 are shown. FIG. 15 illustrates timing of signals within balloon detection circuit 204 of FIG. 14 by showing the signals at the various test points. For test points TP6 and TP7, two different waveforms are illustrated, one in which balloon 52 is inflated ("balloon up") and the other in which balloon 52 is deflated ("balloon down").

As can be seen from FIG. 15, if there are three successive pulses in which a reference signal was produced but no receiver output signal was received, the output of one shot 294 goes high, indicating that balloon 52 is up. As soon as a detected pulse results in a receiver output which corresponds to a reference signal, the output of one shot 294 goes low, indicating that balloon 52 is down. The requirement of multiple missed pulses before the balloon is identified as being inflated greatly reduces the likelihood of any erroneous output from balloon detection circuit 204.

Table 1 shows the components used in one successful embodiment of balloon detection circuit 204.

TABLE 1

| Buffer | 228 | 4049 | Hex Inverting Buffer |
|---|---|---|---|
| Buffer | 230 | 4049 | Hex Inverting Buffer |
| Counter | 238 | 4020 | 14-Stage Binary Ripple Counter |
| One Shot | 240 | 4047 | Multivibrator |
| One Shot | 246 | 4047 | Multivibrator |
| One Shot | 268 | 4047 | Multivibrator |
| NAND/Inverter | 290 | 4011 | Quad 2-Input Nand |
| NAND/Inverter | 292 | 4011 | Quad 2-Input Nand |
| NAND/Inverter | 314 | 4011 | Quad 2-Input Nand |
| NAND/Inverter | 316 | 4011 | Quad 2-Input Nand |
| Op Amp | 248 | NE5534 | Operational Amplifier |
| Op Amp | 250 | NE5534 | Operational Amplifier |
| Photodiode | 306 | MCT2 | Optical Isolator |
| Phototransistor | 308 | MCT2 | Optical Isolator |
| Capacitor | 236 | 470 | Picofarad |
| Capacitor | 244 | 1000 | Picofarad |
| Capacitor | 252 | 100 | Microfarad |
| Capacitor | 270 | 01 | Microfarad |
| Capacitor | 272 | 1000 | Picafarad |
| Capacitor | 280 | 01 | Microfarad |
| Capacitor | 286 | 1000 | Picafarad |
| Capacitor | 296 | 0.1 | Microfarad |

TABLE 1-continued

| Resistor | 232 | 2 M | Ohms |
|---|---|---|---|
| Resistor | 234 | 1.2 M | Ohms |
| Resistor | 242 | 47K | Ohms |
| Resistor | 246 | 470 | Ohms |
| Resistor | 254 | 100 | Ohms |
| Resistor | 256 | 33K | Ohms |
| Resistor | 258 | 10K | Ohms |
| Resistor | 260 | 100K | Ohms |
| Resistor | 262 | 4.7K | Ohms |
| Resistor | 274 | 560K | Ohms |
| Resistor | 276 | 100K | Ohms |
| Resistor | 288 | 47K | Ohms |
| Resistor | 298 | 12 M | Ohms |
| Resistor | 304 | 330 | Ohms |
| Zener Diode | 264 | IN752A | 5 Volt Zener Diode |
| Potentiometer | 255 | 22K | Ohms Potentiometer |
| Potentiometer | 282 | 500K | Ohms Potentiometer |
| Transistor | 300 | 2N2222 | NPN Transistor |
| LED | 310 | 5 VDC | Red Light Emitting Diode |
| LED | 312 | 5 VDC | Green Light Emitting Diode |
| Microphone | 184 | High Impedance | Miniature Crystal Microphone |
| Speaker | 168 | 8 Ohm | Miniature Headphone Speaker |

4. User Interaction—Computer 12

Computer 12 performs three main functions. First, it monitors internal circuits of trainer 14 and determines what event is taking place based upon signals from optical shaft encoder 50 and from balloon detection circuit 204.

Second, computer 12 provides a user friendly environment for the student, which eases the learning of the manual and cognitive skills required in hemodynamic monitoring. To accomplish this, the student may easily scan several topics concerning hemodynamic monitoring, much like reading a text book, but faster and tailored to the student's needs.

Third, computer 12 simulates events which would actually take place if the hemodynamic monitoring were being performed on a live patient. For example, computer 12 preferably recreates a cardiac monitor, similar to that found in a clinical setting, and shows waveforms of the various chambers of the heart and pulminary vasculature as the catheter 30 is advanced into manikin 22.

In this third major function, computer 12 simulates a variety of different diseases, and the student may interactively select therapeutic options and observe the consequences. The diseases are presented in the form of case studies, which include a brief medical history (complete with history, physical and laboratory for each patient), presented on display 14 in the form of a familiar looking hospital chart. Once a decision has been made to place a catheter, the chart is removed from the display, and an image of a simulated cardiac monitor appears. In addition, if elected, the student may observe on display 14 a simulation of a chest fluoroscopic display and thereby watch catheter 30 advance into the chest as it is being advanced into manikin 22.

Figure 16:
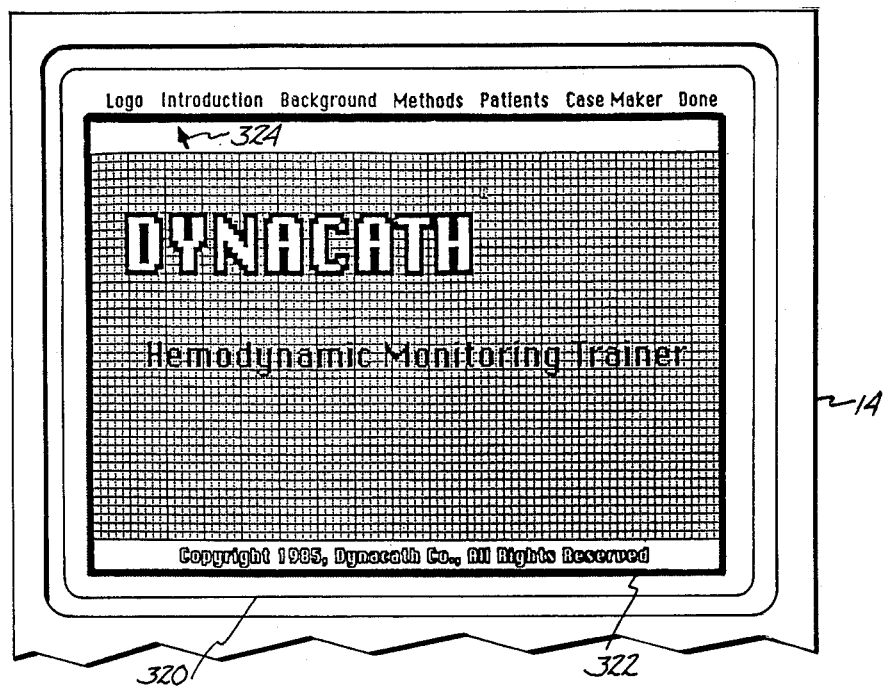
FIGS. 16–18 are images displayed by the computer in its interaction with the student or instructor who is using the training system.

FIG. 16 shows an image which is displayed on display 14 which appears whenever a student or an instructor is selecting the function to be performed. Appearing on screen 320 of display 14 is a rectangular image 322 which has, along its top edge, titles for the various operating sections: "Logo", "Introduction", "Background", "Method", "Patients", "Casemaker", and "Done". The user selects one of these sections by Transmitter assembly 56 includes transmitter fitting 164 which has a recessed cavity 166 for receiving miniature audio speaker 168. Set screw 170 holds speaker 168 securely in position within transmitter fitting 164. Internal passage 172 extends from cavity 166 through fitting 164 to the interior of cylinder 54. Fitting 164 has a neck portion 174 with a pair of snug fit grooves 176 and 178, which allow neck 174 to be press fit mounted in the transmitter end of cylinder 54.

Receiver assembly 58 is located at the opposite end of cylinder 54, and is of generally similar construction to transmitter assembly 56. Receiver fitting 180 has a recess 182 into which miniature microphone 184 is inserted. Set screw 186 holds microphone 184 securely in place within cavity 182. Passage 188 provides communication between the interior of cylinder 54 and microphone 184. Neck 190 of fitting 180 has a pair of snug fit grooves 192 and 194, which assist in providing a press fit mounting of neck 190 in the receiver end of cylinder 54.

One further difference between receiver assembly 58 and transmitter assembly 56 is the presence of entry port 60 which receives the outlet end of tubing 46 and provides a passageway through which catheter 30 enters cylinder 54. Set screw 196 holds the outlet end of tubing 46 securely in place in entry port 60.

As shown in FIG. 11, the entrance of catheter 30 through entry port 60 is at an angle, and does not significantly block the communication between microphone 184 and the interior of cylinder 54.

In operation, speaker 168 periodically chirps at a rate of, for example, five times a second (5Hz). At the opposite end of cylinder 54, microphone 184 listens for each chirp, including the main signal and reverberation set up inside cylinder 54. It has been discovered that when balloon 52 is inflated and much of interior of cylinder 54 is blocked, a detectable attenuation of the primary chirp and the reverberations occurs. The circuitry associated with microphone 184 conditions each received chirp, temporally compares it with a tuned, phase-shifted reference pulse from the speaker driver circuitry, and determines whether balloon 52 is inflated or deflated.

3. Trainer Circuitry 51

Figure 12:
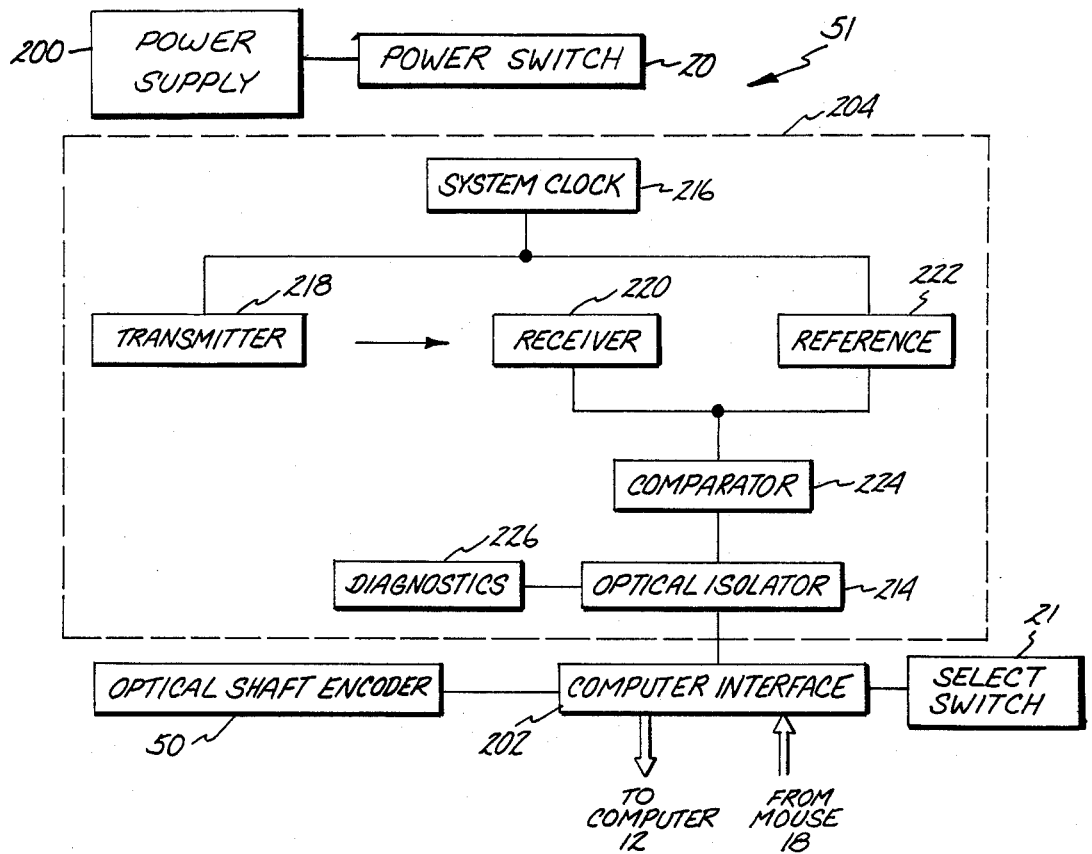
FIG. 12 is a block diagram of the trainer circuitry.

FIG. 12 shows a block diagram of the trainer circuitry 51. Basically, trainer circuitry 51 can be described as four separate units: power supply 200, optical shaft encoder 50, computer interface 202, and balloon detection circuitry 204.

Figure 13:
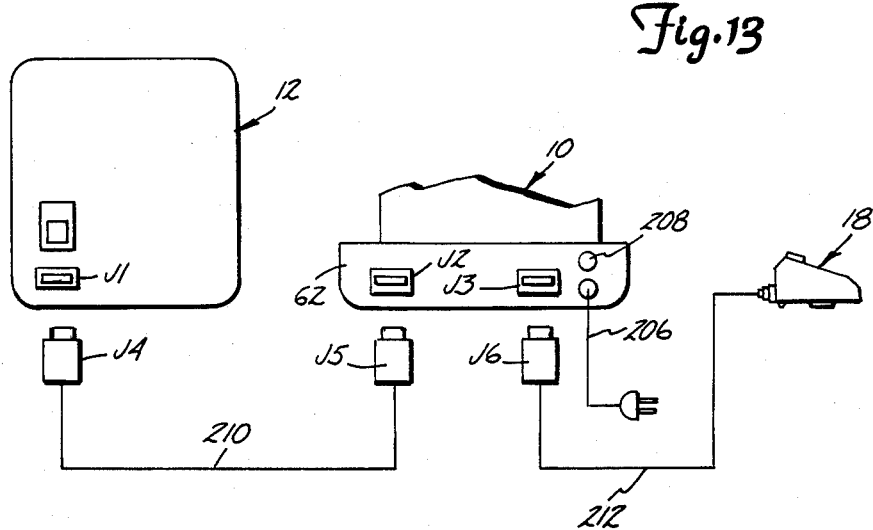
FIG. 13 is a diagram illustrating interconnection of the mouse, trainer and computer.

Traniner 10 has its own power supply circuitry 200 which converts the incoming AC line voltage to the necessary DC voltage levels required for operation of the various components within trainer circuitry 51. Power supply circuitry 200 typically includes a power cord 206 and a circuit breaker 208 (which are shown in FIG. 13) as well as a step-down transformer and a direct current supply (which are not shown). The direct current supply provides ±5 V as well as ground for operation of operational amplifiers within balloon detection circuitry 204. Power switch 20 is connected in the power supply circuitry to turn trainer 10 on and off.

Optical shaft encoder circuitry 50 is, in the preferred embodiment, the same encoder which is used in the Apple Macintosh computer mouse. This device requires a five volt supply voltage for operation of phototransistors 156 and 158 and photodiodes 152 and 154. This supply voltage preferably is obtained directly from computer 12 by an arrangement in which either mouse 18 or optical shaft decoder 50 is connected through computer interface 202 to computer 12, depending on the position of selection switch 21. In this embodiment, the optical shaft encoder 50 operates by taking the place of mouse 18. Rather than providing encoded data about mouse movement, computer interface 202 provides encoded data about movement of catheter 30. The output of optical shaft encoder 50 is subsequently decoded by the already existing hardware within computer 12 and is available for further data processing and interpretation.

Computer interface 202 is shown diagramatically in FIG. 13. Jack J1 is located at the rear of computer 12, while jacks J2 and J3 are located at the back of chassis 62 of trainer 10. Multiconductor cable 210 has jack J4 at one end for connection to jack J1 of computer 12, and jack J5 at its opposite end for connection to jack J2 of trainer 10. Mouse 18 is connected through multiconductor cable 212 to jack J3 of trainer 10. Jack J6 at the end of cable 212 mates with jack J3. In a preferred embodiment, jacks J1 and J3 are nine pin subminiature-D female chassis connectors, jack J2 is a nine pin subminiature-D male chassis connector, jacks J4 and J6 are nine pin subminiature-D male line connectors, and jack J5 is the nine pin subminiature-D female line connector.

Computer interface 202 selectively routes through jack J2 to computer 12 either (a) signals from optical encoder 50 and optical isolator 214 of balloon detection circuitry 204, or (b) signals to mouse 18. In addition, power to mouse 18 and optical encoder 50 is received from computer 12 and is supplied selectively either to optical encoder 50 or mouse 18.

The selection of the signals to be routed to computer 12 is made by select switch 21 which in one embodiment is a four-pole, double-throw switch. In one position, mouse 18 is connected to computer 12. In the opposite position, signals from optical isolator 214 and optical encoder 50 will be routed to computer 12. Computer interface 202 also causes the appropriate indicator 21A or 21B to be lit depending on the position of select switch 21.

Balloon detection circuitry 204 is shown in block diagram in FIG. 12 and in schematic diagram in FIG. 14. It includes optical isolator 214, system clock 216, transmitter 218, receiver 220, reference 222, comparator 224, and diagnostics circuit 226.

Clock 216 includes an astable multivibrator formed by inverting buffers 228 and 230, resistors 232 and 234, and capacitor 236. The 640 Hz output of the astable multivibrator is divided by divide-by-N counter 238 to provide the 5 Hz clock signal which is supplied to transmitter 218 and to reference 222.

Transmitter 218 includes a positive triggered one-shot multivibrator 240 with associated timing resistor 242 and capacitor 244, current limiting resistor 246 and speaker 168. The output of transmitter 218 is an acoustic signal which sends quiet chirps at a frequency of five per second down cylinder 54 of acoustic detection chamber 48.

The acoustic signals produced by transmitter 218 are detected by receiver 220. The received signals from microphone 184 are amplified by an amplifier and unipolar feedback limiter circuit formed by operational amplifier (op amp) 250, capacitor 252, potentiometer 255, resistors 254, 256, 258, 260 and 262, and Zener diode 264. The output of op amp 250 is supplied to a signal processor formed by two positive triggered oneto observe the consequences of particular treatment options and learn to expect and interpret changes in waveforms and readout values which can occur during hemodynamic monitoring.

Figure 17:
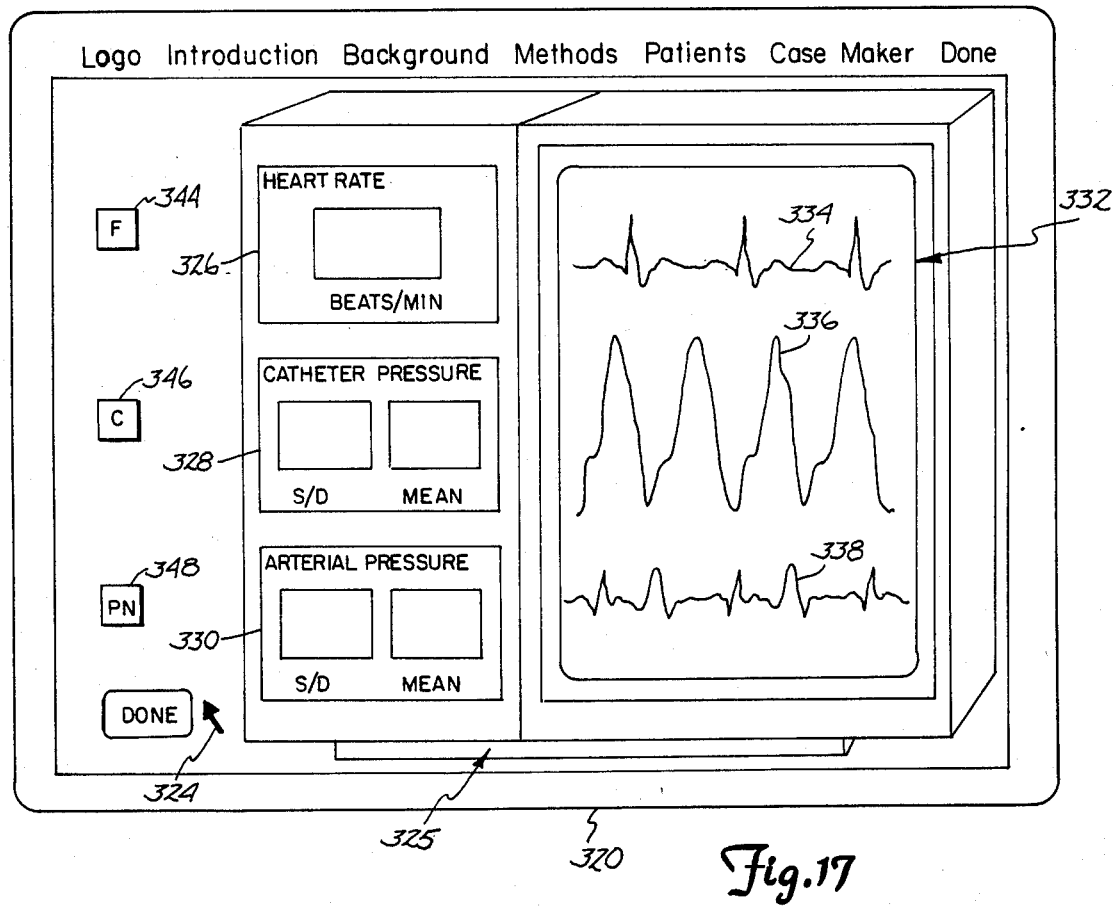

Also shown on screen 320 in FIG. 17 are icons 344, 346 and 348. Icon 344 represents the fluoroscopic display mode, in which a simulated fluoroscopic image of the patient's chest showing the location of the tip of catheter 30, is displayed on screen 320. The location of the tip of catheter 30 as shown in the fluoroscopic display is dependent upon the signals from catheter position sensor 44. The student selects the fluoroscopic display by placing cursor 324 adjacent icon 344 and supplying an EXECUTE command through mouse 18.

Icon 346 represents a mode in which cardiac output using thermodilution is selected. In this mode, a cardiac output value (which would be measured in actual conditions using catheter 30) is displayed on screen 320. The cardiac output mode is selected by placing cursor 322 adjacent icon 346, and supplying an EXECUTE command.

Icon 348 represents a progress note mode. When this mode is selected, a progress note is displayed in text form on screen 320. The progress note describes the status of the patient at that time. The progress notes are previously prepared by the instructor and stored in memory by computer 12. The progress note allows the student to determine at any time the current status of the patient, and thus allows the student to confirm conclusions which the student may have made about the patient's current status based upon the information displayed by simulated instrument 325.

5. Conclusion

The hemodynamic training system of the present invention represents an extremely powerful yet user friendly and simple-to-use system for teaching the purpose, indications, methods, complications and techniques of hemodynamic monitoring of patients. This system provides a full simulation of the hemodynamic monitoring process, and in fact provides more information to the student than can be obtained conveniently using traditional training methods which take place at bedside using real, critically ill patients.

Although the present invention has been described with reference to preferred embodiments, workers skilled in the art will recognize that changes may be made in form and detail without departing from the spirit and scope of the invention.

What is claimed is:

1. A training system comprising:
   a manikin having an insertion site at which a catheter may be inserted into the manikin;
   means positioned at the insertion site for receiving a catheter as it is inserted into the manikin at the insertion site;
   means for guiding the catheter along a path from the insertion site;
   position sensing means for providing signals from which a location of a tip of the catheter can be determined; and
   means for providing an output as a function of the signals from the position sensing means.

2. The system of claim 1 wherein the position sensing means is positioned along the path and wherein signals provided by the position sensing means indicate movement of the catheter along the path.

3. The system of claim 2 wherein the position sensing means comprises:
   roller means for engaging the catheter and rotating as a function of movement of the catheter along the path; and
   encoder means for providing signals as a function of rotation of the roller means.

4. The system of claim 3 wherein the position sensing means further comprises:
   means for urging the catheter into contact with the pressure roller.

5. The system of claim 1 wherein the catheter is a hemodynamic monitoring catheter having an inflatable balloon at its tip, and wherein the system further comprises:
   balloon state detecting means located adjacent an end of the path for providing signals which indicate when the balloon is inflated and deflated.

6. The system of claim 5 wherein the means for providing an output provides the output as a function of the signals provided by the position sensing means and the balloon state detecting means.

7. The system of claim 6 wherein the balloon state detecting means comprises an acoustic detection chamber connected at the end of the path and into which the tip of the catheter is advanced, and wherein the acoustic detection chamber detects inflated and deflated states of the balloon within the chamber based upon transmission of acoustic signals within the chamber.

8. The system of claim 7 wherein the acoustic detection chamber comprises:
   a cylinder having an inner diameter large enough to permit inflation of the balloon within the cylinder;
   transmitter means positioned at a first end of the cylinder for transmitting acoustic signals;
   receiver means positioned at a second end of the cylinder for receiving acoustic signals;
   port means for permitting passage of the catheter into the cylinder; and
   means for deriving a balloon state signal as a function of signals from the receiver means.

9. The system of claim 8 wherein the means for deriving a balloon state the signal comprises:
   means for providing a transmitter drive signal to the transmitter means;
   means for deriving a reference signal from the transmitter drive signal;
   means for deriving a receiver signal from the receiver means; and
   means for comparing the reference signal and the receiver signal to produce the balloon state signal.

10. The system of claim 1 wherein the manikin comprises a hollow shell representing a portion of a human body, the manikin having an opening at the insertion site.

11. The system of claim 10 and further comprising:
    an insertion plug positioned over the opening opening in the manikin, the insertion plug having a flexible top with an entry slit therein through which the catheter may be inserted and withdrawn.

12. The system of claim 11 wherein the insertion plug has a neck extending from an inner surface of its top which extends into the opening in the manikin to position the insertion plug at the insertion site.

13. The system of claim 12 wherein the insertion plug further includes, on the inner surface of its top, a hardened entry lip surrounding the entry slit.

moving cursor 324 to the appropriate title and pressing the ENTER key or button on mouse 18.

"Logo", when selected, displays a menu of some subsections which can then be selected by the user again by locating cursor 34 at the particular subsection of interest. Under "Logo" the subsections include "About the Dynacath System" (which provides general information); "Dynacath Hardware Tester" (which allows diagnostic testing of the system hardware to be performed); and "Instructional Text Editor" (which is a word processing program used whenever an instructor is creating text material to be read by students in one of the other sections).

"Introduction" displays a menu which includes subsections entitled "Getting Started", "About the Dynacath Hardware", and "About the Dynacath Software". Selecting any one of these three subsections causes computer 12 to display introductory text material on screen 320. This includes general instructional material which familiarizes the user with the operating principles of the hardware and software, as well as the theory of operation and uses of the system.

"Background" has four subsections which are displayed in a menu: "Principles of Hemodynamic Monitoring", "Waveform Characteristics and Identification", "Disease Determination and Therapeutic Options" and "Further Reading". Each of these four subsections contain textual material to be read by a student in order to familiarize the student with the process and techniques of hemodynamic monitoring. The student will normally review this material before attempting a simulated catheter insertion and monitoring.

The "Methods" section includes three subsections entitled "Review of Technical Skills", "Understanding the Instrumentation", and "Common Problems and Complications". Each of these sections include text material and appropriate graphics which instruct the student on the techniques used in the catheterization process, in understanding the information which is derived from hemodynamic monitoring, and problems and complications which can be encountered during hemodynamic monitoring.

The "Patients" section is used by the student when simulating the entire hemodynamic monitoring process. The "Patients" section accesses files which contain data necessary to simulate the hemodynamic monitoring process as the student inserts the catheter into manikin 22. The student can select a patient file by name or by disease category, or may allow computer 12 to select the patient at random for study.

The "Casemaker" section allows the instructor to create a new patient file, to edit an existing patient file, or to delete an existing patient file. The instructor can, for example, enter new information about the patient, create new or different waveforms which will be displayed during the simulated monitoring, or select and store complications which will occur during the simulation in order to test the manual and cognitive skills of the student.

The "Done" section allows the student or instructor to signal the computer 12 that he or she is done with a particular section, or is done using the system entirely.

FIG. 17 shows screen 320 during a simulation of hemodynamic monitoring. This simulation (which occurs when the student has selected a patient from the "Patients" section and has performed the catheterization procedure) results in an image of a simulated hemodynamic monitoring instrument 325. Simulated instrument 325 includes a simulated heart rate display 326, a simulated catheter pressure display 328, a simulated arterial pressure display 330, and a simulated oscilloscope display 332.

Heart rate display 326 displays a numerical value representing beats per minute. This value is, of course, stored in memory corresponding to the particular patient file. The heart rate which is displayed is representative of a measurement which can typically be made from an electrocardiogram signal.

Catheter display 328 displays two numerical values which simulate measurements made by cathether 30 when inserted in the patient and when balloon 52 is inflated. One value is alternatively the systolic or the diastolic pressure, and the other value is a mean pressure. These values are stored in the patient file and are dependent upon whether balloon 52 is inflated and the sensed position of the catheter within manikin 22 (based upon the position signals from catheter position sensor 44). Computer 12 selects the appropriate values to be displayed in catheter pressure display 328 based upon those inputs from trainer 10.

Arterial pressure sensor display 330 also displays systolic or diastolic pressure and a mean pressure. These pressures are typically measured by a separate sensing device (i.e. they are not read using catheter 30). Once again, the values which are displayed on simulated arterial pressure display 330 are stored in the patient file by computer 12, and are retrieved for display when the display mode showing instrument 325 is selected by the student.

Simulated waveform display 332 shows, in the preferred embodiment illustrated in FIG. 17, three separate waveforms 334, 336 and 338. Waveform 334 is an electrocardiogram (ECG) waveform. Waveform 336 is a waveform which represents pressure measured by catheter 30. Depending on the position of the cathether within manikin 22, computer 12 selects one of four previously stored waveform types: a right atrial, a right ventrical, a pulmonary artery, or a wedge pressure waveform.

Waveform 338 is an arterial pressure waveform. Like the pressure values displayed on simulated arterial pressure display 338, a waveform like the one displayed on arterial pressure waveform 338 would be derived in actual practice from a separate sensing device.

Figure 18:
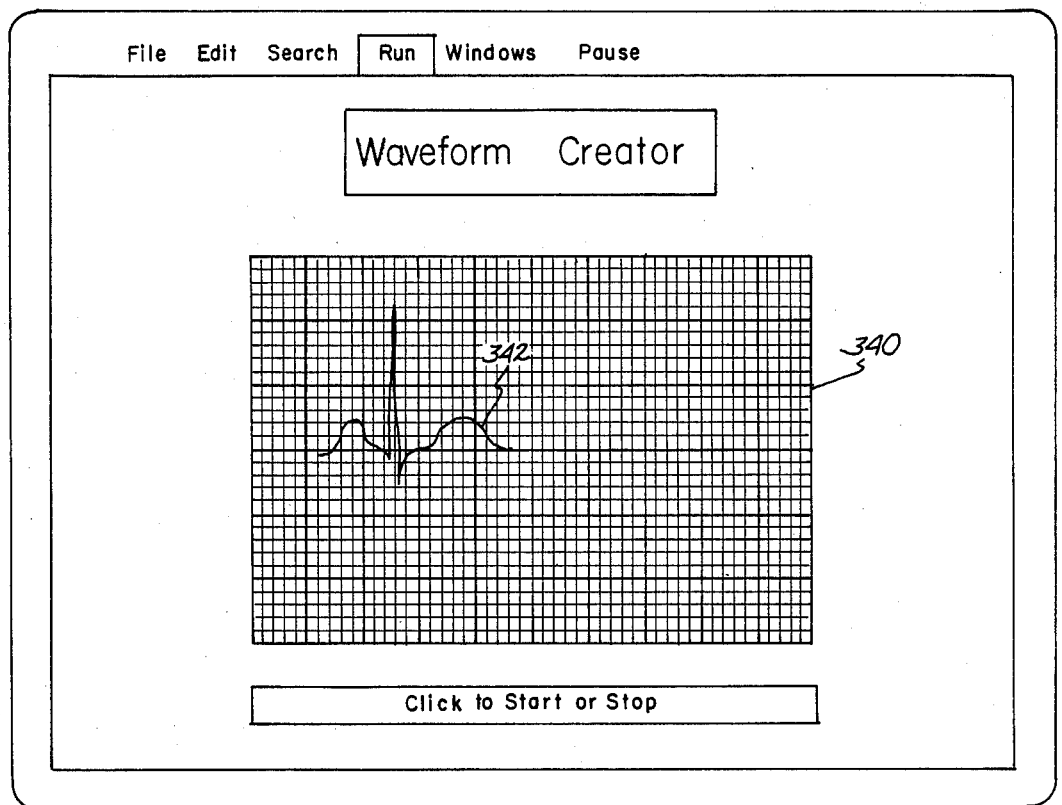

Waveforms 334, 336 and 338 preferably are created by the instructor using the Casemaker section. One of the functions which can be performed in the Casemaker section is entitled "Waveform Creator". In this mode, a display like the one shown in FIG. 18 appears on screen 320. The display includes a simulated graph paper 340 on which the instructor draws a waveform section 342. This waveform section can be created using mouse 18. When the instructor has completed drawing the waveform section, the instructor signals computer 12 using the key on mouse 18. Computer 12 treats waveform section 342 as one period of the waveform, and replicates section 342 to produce a multiperiod waveform like the one shown in FIG. 17. In this particular example, section 342 of FIG. 18 is one period of the ECG waveform 334 shown in FIG. 17.

In preferred embodiments of the present invention, the instructor can store a set of waveforms for each of several different scenarios. The particular set which is selected to be displayed on simulated instrument 324 depends upon the particular treatment option which is selected by the student. In this way, the student is able 14. The system of claim 13 wherein the insertion plug has a flesh color, with a vein coloration area generally aligned with the entry slit.

15. The system of claim 11 wherein the means for defining a path includes a first guide tube having an inlet and an outlet end; and wherein the means for receiving the catheter comprises an insertion adapter mounted at the insertion site below the insertion plug, the insertion adapter having a cavity which is generally aligned with the entry slit of the insertion plug for guiding the catheter from the entry slit into the inlet end of the guide tube.

16. The system of claim 15 wherein the cavity of the insertion adapter has slanted surfaces which form a funnel toward the inlet end of the guide tube.

17. The system of claim 1 wherein the means for providing an output comprises:
    means for deriving a catheter tip position based upon the signals from the position sensing means; and
    means for displaying a simulated waveform based upon the catheter tip position.

18. The system of claim 1 wherein the means for providing an output comprises:
    computer means for receiving the signals from the position sensing means, the computer means including means for storing data from which simulated output information can be generated as a function of location of the catheter tip; and
    display means controlled by the computer to display output information selected by the computer from the stored data based upon the location of the catheter tip.

19. The system of claim 18 wherein the computer means stores data for each of a plurality of hypothetical patients, the data including output information to be displayed when a particular one of the patients is selected.

20. The system of claim 19 wherein the computer means stores data representing hemodynamic monitoring waveforms.

21. The system of claim 20 wherein the computer means stores data from which a simulated chest fluoroscopic display is produced by the display means, the simulated fluoroscopic display providing a visual indication of the location of the catheter tip within the chest as a function of the derived catheter tip location.

22. The system of claim 1 wherein the manikin has a plurality of insertion sites; wherein the means for defining a path includes a plurality of guide tubes, each guide tube having an inlet end adjacent one of the insertion sites; and combiner means connected to outlet ends of the guide tubes for causing a convergence of individual paths defined by the guide tubes to a single path.

23. The system of claim 22 wherein the position sensing means is positioned along the single path.

24. A training system comprising:
    a manikin representing a portion of a human body, the manikin having a first insertion site at which a catheter may be inserted into the manikin;
    a chamber;
    guide means for guiding the catheter along a path between the first insertion site and the chamber to simulate movement of the catheter to a desired location within the human body;
    means for determining a position of a tip of the catheter; and
    means for displaying a waveform which represents a simulation of a parameter measured using the catheter when the tip is located within the human body at a location corresponding to the position of the tip within the manikin.

25. A training system comprising:
    a manikin representing a portion of a human body, the manikin having a first insertion site at which a catheter may be inserted into the manikin;
    a chamber;
    guide means for guiding the catheter along a path between the first insertion site and the chamber to simulate movement of the catheter to a desired locaton within the human body;
    means for providing encoder signals representing incremental motion of the catheter along the path; and
    means for determining a position of the tip based upon the encoder signals; and
    means for providing an output as a function of the position.

26. A training system for training in the use of a catheter of a type having an inflatable balloon at its tip, the system comprising:
    a manikin representing a portion of a human body, the manikin having a first insertion site at which the catheter may be inserted into the manikin;
    a chamber;
    guide means for guiding the catheter along a path between the first insertion site and the chamber to simulate movement of the catheter to a desired location within the human body;
    transmitter means positioned at a first end of the chamber for transmitting acoustic signals;
    receiver means positioned at a second end of the chamber for receiving acoustic signals; and
    means for deriving a balloon state signal as a function of signals from the receiver means.

27. The system of claim 26 wherein the means for deriving the balloon state signal comprises:
    means for providing a transmitter drive signal to the transmitter means;
    means for deriving a reference signal from the transmitter drive signal;
    means for deriving a receiver signal from the receiver means; and
    means for comparing the reference signal and the receiver signal to produce the balloon state signal.

28. A training system comprising:
    a manikin representing a portion of a human body, the manikin having an opening at a first insertion site at which a catheter may be inserted into the manikin;
    a chamber;
    guide means for guiding the catheter along a path between the first insertion site and the chamber to simulate movement of the catheter to a desired location within the human body;
    an insertion plug positioned over the opening in the manikin, the insertion plug having a flexible top with an entry slit therein through which the catheter may be inserted and withdrawn;
    wherein the insertion plug has a neck which extends into the opening in the manikin to position the insertion plug at the first insertion site;
    wherein the insertion plug further includes a hardened entry lip surrounding the entry slit;
    wherein the insertion plug has a flesh color, and a vein coloration area generally aligned with the entry slit; and wherein the guide means comprises:
a first guide tube having an inlet and an outlet end; and
an insertion adapter mounted at the first insertion site below the insertion plug, the insertion adapter having a cavity which is generally aligned with the entry slit of the insertion plug for guiding the catheter from the entry slit into the inlet end of the first guide tube; wherein the cavity of the insertion adapter has slanted surfaces which form a funnel toward the inlet end of the first guide tube.

29. A training system comprising:
a manikin representing a portion of a human body, the manikin having first and second insertion sites at which a catheter may be inserted into the manikin;
a chamber;
guide means for guiding the catheter along a path between the first insertion site and the chamber to simulate movement of the catheter to a desired location within the human body; wherein the guide means comprises:
a first guide tube leading from the first insertion site;
a second guide tube leading from the second insertion site;
combiner means connected to the first and second guide tubes for causing a convergence of separate paths defined by the guide tubes to a common path which leads to the chamber.

30. A training system for training in the use of a catheter which has an inflatable balloon at its tip, the system comprising:
a manikin representing a portion of a human body, the manikin having an insertion site at which the catheter may be inserted into the manikin;
guide means for guiding the catheter along a path from the insertion site;
means for sensing position of the catheter tip along the path;
means for sensing whether the balloon is inflated; and
means for providing a simulated output based upon the position of the catheter tip and whether the balloon is inflated.

31. A training system for training in the use of a catheter, the system comprising:
a manikin having an opening at an insertion site;
an insertion plug positioned over the opening, the insertion plug having a flexible top with an entry slit through which the catheter may be inserted and withdrawn; wherein the insertion plug has a neck which extends into the opening in the manikin to position the insertion plug at the insertion site; wherein the insertion plug further includes a hardened entry lip surrounding the entry slit; and
guide means for guiding the catheter from the entry slit along a path to simulate movement of the catheter to a desired location within a human body; wherein the guide means includes a guide tube having an inlet end and an outlet end; and an insertion adapter mounted at the insertion site below the insertion plug, the insertion adapter having a cavity which is generally aligned with the entry slit of the insertion plug for guiding the catheter from the entry slit into the inlet end of the guide tube; wherein the cavity of the insertion adapter has slanted surfaces which form a funnel toward the inlet end of the guide tube.

32. The system of claim 31 and further comprising:
means for determining a position of the catheter along the path; and
means for providing an output as a function of the position.

33. The system of claim 31 wherein the insertion plug has a flesh color, and a vein coloration area generally aligned with the entry slit.

* * * * *